United States Patent
Peduto et al.

(10) Patent No.: US 6,864,354 B2
(45) Date of Patent: *Mar. 8, 2005

(54) MODIFIED POLYAMIDES, POLYAMIDE COMPOSITIONS, AND METHOD FOR MAKING SAME

(75) Inventors: Nicolangelo Peduto, Cesano Maderno (IT); Franco Speroni, Laghetto (IT); Haichun Zhang, Saronno (IT)

(73) Assignee: Rhodia Engineering Plastics S.r.l., Ceriano Laghetto (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/311,548

(22) PCT Filed: Jun. 15, 2001

(86) PCT No.: PCT/EP01/06728

§ 371 (c)(1),
(2), (4) Date: Aug. 8, 2003

(87) PCT Pub. No.: WO01/96441

PCT Pub. Date: Dec. 20, 2001

(65) Prior Publication Data

US 2004/0030057 A1 Feb. 12, 2004

(30) Foreign Application Priority Data

Jun. 16, 2000 (FR) ............................................ 00 07705

(51) Int. Cl.[7] ........................ C08G 73/00; C08G 69/28; C08L 77/00; C08F 6/00
(52) U.S. Cl. ........................ 528/480; 528/310; 528/312; 528/322; 528/332; 528/335; 528/336; 525/418; 525/419; 525/420; 525/432; 525/486; 525/491; 525/492; 524/433; 524/443; 524/444; 524/451; 524/600; 524/606; 428/411.1; 428/474.4; 264/176.1; 264/211.12; 264/211.21

(58) Field of Search .................................. 528/310, 312, 528/322, 332, 335, 336, 480, 486, 491, 492, 323, 326; 525/418–420, 422, 432; 524/433, 443, 444, 451, 600, 606; 264/176.1, 211.12, 211.21; 428/411.1, 474.4

(56) References Cited

U.S. PATENT DOCUMENTS

| | | | | |
|---|---|---|---|---|
| 5,688,901 A | * | 11/1997 | Fisch et al. | 528/310 |
| 6,060,580 A | * | 5/2000 | Nijenhuis et al. | 528/332 |
| 6,166,171 A | * | 12/2000 | Yamamoto et al. | 528/310 |
| 6,274,697 B1 | * | 8/2001 | Zahr | 528/310 |
| 6,277,948 B1 | * | 8/2001 | Zahr | 528/310 |
| 6,500,881 B1 | * | 12/2002 | Galli et al. | 523/205 |
| 6,525,166 B1 | * | 2/2003 | Di Silvestro et al. | 528/310 |
| 6,608,123 B2 | * | 8/2003 | Galli et al. | 524/100 |

FOREIGN PATENT DOCUMENTS

| | | |
|---|---|---|
| EP | 0 682 057 A | 11/1995 |
| FR | 2 743 077 A | 7/1997 |
| FR | 2 779 730 A | 12/1999 |
| WO | WO 99 03909 | 1/1999 |

* cited by examiner

*Primary Examiner*—P. Hampton Hightower
(74) *Attorney, Agent, or Firm*—Burns, Doane, Swecker & Mathis, L.L.P.

(57) ABSTRACT

The invention relates to modified polyamides, and more particularly to polyamides containing units of the type obtained by reacting a diacid with a diamine, modified with a multifunctional compound. The finished articles shaped from these polyamides or from compositions based on these polyamides have excellent mechanical properties and also a very good surface aspect. The modified polyamide according to the invention is obtained by melt-blending polyamides of different natures, in the presence of a multifunctional compound.

16 Claims, No Drawings

MODIFIED POLYAMIDES, POLYAMIDE COMPOSITIONS, AND METHOD FOR MAKING SAME

The present invention relates to modified polyamides, and more particularly to polyamides containing units of the type obtained by reacting a diacid with a diamine, modified with a multifunctional compound. Finished articles shaped from these polyamides or from compositions based on these polyamides have excellent mechanical properties and also a very good surface aspect. The invention also relates to a process for obtaining these polyamides and compositions.

In the field of technical plastics, it is often sought to modify polymer compositions in order to impart advantageous properties to articles shaped therefrom or from compositions comprising them. The mechanical properties and the surface aspect of the articles are examples of properties observed on the articles.

Polymer compositions often comprise fillers intended to modify the mechanical properties or to reduce the costs of the material. If the fillers are present in large amount, the surface aspect of the articles obtained may become unsatisfactory.

Patent FR 98/15878 (2 743 077) describes compositions comprising fillers and a polyamide modified with a multifunctional compound. The polyamide at least partially has a macromolecular structure in starburst form with repeating units of polyamide-6 type. Such compounds are known as starburst polyamides. These polyamides have a high melt flow index, which makes it possible to increase the filler content in the composition without deteriorating the surface aspect, i.e. without being able to observe the fillers at the surface of the articles. The polyamide is obtained by copolymerization of a multifunctional compound with monomers of amino acid or lactam type.

Document EP 672 703 describes a process for producing different starburst polyamides, by introducing a multifunctional compound into a polyamide during an extrusion operation. It is mentioned in this document that a decrease in pressure in the extrusion device is observed for various polymers.

The articles made from these compositions comprising a filler and a matrix consisting of a polymer modified in accordance with these documents have a surface that does not leave the fillers showing. However, the surface aspect is dull.

In many fields, for example in the field of motor vehicle bodywork, it is sought to obtain articles whose surface aspect is shiny or at the surface of which good reflectivity of light is observed.

One object of the present invention is to propose a novel modified polyamide, containing in particular repeating units of the type obtained by polycondensing a dicarboxylic acid with a diamine, the thermomechanical properties of which are satisfactory, in particular impact strength, and which has a high melt flow index. This modified polyamide, when used as a matrix with fillers, makes it possible to obtain articles whose surfaces show good reflectivity. An object of the invention is thus also to propose filled compositions that have an excellent surface aspect. The invention also proposes a process for obtaining such polyamides or compositions.

To this end, the invention proposes a modified polyamide capable of being obtained by melt-reacting at least the following three compounds:

Compound A: a polyamide containing repeating units of formula (I):

$$\text{—[NH—R}_1\text{—NH—OC—R}_2\text{—CO]—} \qquad \text{(I)}$$

Compound B: a polyamide containing repeating units of formula (II):

$$\text{—[NH—R}_3\text{—CO]—} \qquad \text{(II)}$$

Compound C: a multifunctional compound comprising at least three reactive functions chosen from amines, carboxylic acids and derivatives thereof, the reactive functions being identical, the radicals $R_1$, $R_2$ and $R_3$ being hydrocarbon-based radicals optionally comprising hetero atoms.

The process of melt-blending and reaction consists in placing the compounds in contact at a temperature and/or a shear that are sufficient for the compounds to be in the molten phase, and to at least partially react together. This temperature is preferably greater than 250° C. It is thought that the reactive functions of compound C react at least partially with the end functions of the polyamide chains of compounds A and/or B. To this end, the residence time of the compounds in the mixing and reaction device must preferably be sufficiently long.

According to one particularly advantageous embodiment, the melt-blending and the reaction are performed using an extrusion device, for example a single-screw or twin-screw device.

Such devices are commonly used in the fields of technical plastics formulation and are well known to those skilled in the art.

The modified polyamides according to the invention have an improved melt flow index compared with identical compositions which do not contain a multifunctional compound, or compared with compositions obtained from compounds A and C, without B. They also have satisfactory impact strength.

The invention also relates to compositions comprising fillers, preferably mineral fillers, and a matrix consisting of modified polyamide. The weight proportion of the fillers in the composition is preferably between 25% and 80%. The filled compositions may be produced by introducing the molten fillers into an extrusion device, during the production of the blend of compounds A, B and C or subsequently by remelting or extruding a modified polyamide obtained by blending the compounds A, B and C.

The preferred mineral fillers are chosen from glass fibres, carbon fibres, ceramic fibres, talc, kaolin, wollastonite and exfoliated clays.

The compositions may contain other additives such as flame retardants, lubricants, wollastonite stabilizers, resilience modifiers, pigments, colorants, antioxidants and plasticizers.

Examples of flame-retardant compounds that may be mentioned include red phosphorus, melamine derivatives such as melamine phosphate, polyphosphate or pyrophosphate, halogenated compounds, more particularly brominated compounds, and compounds based on magnesium hydroxide.

Examples of resilience modifiers that may be mentioned include elastomers, optionally grafted with maleic anhydride, such as EPDMs, EPRs and SEBSs, silicone elastomers and nitrile rubbers.

These examples have no limiting nature.

The proportions of each of the three components used to obtain the modified polyamides, optionally with other compounds, are preferably as follows:

the ratio between the mass of compound A and the total mass of the compounds A, B and C is between 1% and 98.5% the ratio between the mass of compound B and the total mass of the compounds A, B and C is between 1% and 98.5% the equivalent molar concentration of reactive functions of compound C in the polymer is greater than 1%. It is more preferably greater than 2%.

The expression "equivalent molar concentration of reactive functions of compound C" means the number x defined by the following formula:

$$x = f * \frac{m_C/M_C}{m_A/M_A + 2*m_B/M_B + m_C/M_C}$$

in which:

f is the number of reactive functions in compound C $m_A$, $m_B$ and $m_C$ are, respectively, the masses of compounds A, B and C mixed $M_A$ and $M_B$ are, respectively, the molar masses of the repeating units of compounds A and B $M_C$ is the molar mass of compound C.

The ratio between the mass of compound A and the total mass of compounds A, B and C is preferably greater than 50%.

The ratio between the mass of compound C and the total mass of compounds A, B and C is preferably between 1.5% and 10%.

Many multifunctional compounds may be used to carry out the invention. These compounds are organic or organometallic compounds containing at least three reactive chemical functions, all the reactive functions being identical. These functions are chosen from amines, carboxylic acids and derivatives thereof. The term "reactive function" means a function capable of reacting with a terminal function of the polyamide chains of compounds A and/or B. These compounds are capable, for example, of forming amide bonds.

The multifunctional compounds may be chosen from compounds with an arborescent or dendritic structure.

The multifunctional compounds may also be chosen from compounds of formula (III)

R4—[A-X—H]$_m$      (III)

in which

A is a covalent bond or an aliphatic hydrocarbon-based radical possibly containing hetero atoms, and containing from 1 to 20 carbon atoms and preferably from 1 to 6 carbon atoms;

X is a radical

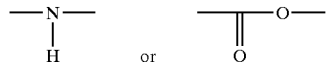

$R_4$ is a linear or cyclic, aromatic or aliphatic hydrocarbon-based radical containing at least two carbon atoms and possibly containing hetero atoms;

m is an integer between 3 and 8 (limits included).

According to yet another preferred characteristic, the radical $R_4$ is either a cycloaliphatic radical such as the tetravalent cyclohexanonyl radical, or a 1,1,1-triylpropane or 1,2,3-triylpropane radical.

As other radicals $R_4$ that may be suitable for the invention, examples that may be mentioned include substituted or unsubstituted cyclohexanyl and phenyl trivalent radicals, diaminopolymethylene tetravalent radicals with a number of methylene groups advantageously between 2 and 12, such as the radical derived from EDTA (ethylenediaminotetraacetic acid), cyclohexanonyl or cyclohexadinonyl octavalent radicals, and radicals derived from compounds obtained from the reaction of polyols such as glycol, pentaerythritol, sorbitol or mannitol with acrylonitrile.

The radical A is preferably a methylene or polymethylene radical such as ethyl, propyl or butyl radicals, or a polyoxyalkylene radical such as the polyoxyethylene radical.

According to one preferred embodiment of the invention, the number m is greater than 3 and advantageously equal to 3 or 4.

The reactive function of the multifunctional compound represented by the symbol X—H is a function capable of forming an amide function.

As examples of polyfunctional compounds of formula III, mention may be made of 2,2,6,6-tetra(β-carboxyethyl) cyclohexanone, diaminopropane-N,N,N',N'-tetraacetic acid of the following formula:

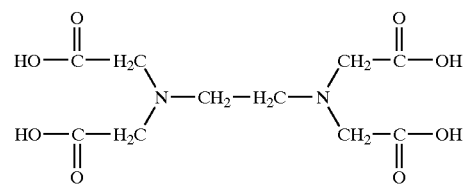

or compounds derived from the reaction of trimethylolpropane or of glycerol with propylene oxide and amination of the terminal hydroxyl groups; the latter compounds are sold under the trade name Jeffamines T® by the company Huntsman, and have the general formula:

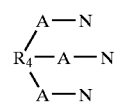

in which:

$R_4$ represents a 1,1,1-triylpropane or 1,2,3-triylpropane radical,

A represents a polyoxyethylene radical.

Examples of multifunctional compounds that may be suitable are especially mentioned in document U.S. Pat. No. 5,346,984, in document U.S. Pat. No. 5,959,069, in document WO 96/35739 and in document EP 672 703.

The following may be mentioned more particularly: nitrilotrialkylamines, in particular nitrilotriethylamine, dialkylenetriamines, in particular diethylenetriamine, trialkylenetetramines and tetraalkylenepentamines, the alkylene preferably being ethylene, 4-aminoethyl-1,8-octanediamine.

Mention is also made of the dendrimers of formula (II)

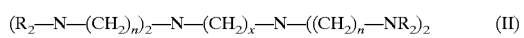

$(R_2—N—(CH_2)_n)_2—N—(CH_2)_x—N—((CH_2)_n—NR_2)_2$      (II)

in which

R is a hydrogen atom or a group —$(CH_2)_n$—$NR^1{}_2$ in which $R^1$ is a hydrogen atom or a group —$(CH_2)_n$—$NR^2{}_2$ in which $R^2$ is a hydrogen atom or a group —$(CH_2)_n$—$NR^3{}_2$ in which $R^3$ is a hydrogen atom or a group —$(CH_2)_n$—$NH_2$, n being an integer between 2 and 6, x being an integer between 2 and 14, n is preferably an integer between 3 and 4, in particular 3, and x is preferably an integer between 2 and 6, preferably between 2 and 4, in particular 2.

Each radical R may be chosen independently of the others. The radical R is preferably a hydrogen atom or a group —$(CH_2)_n$—$NH2$.

Mention is also made of multifunctional compounds containing 3 to 10 carboxylic acid groups, preferably 3 or 4. Among these, the ones that are preferred are the compounds containing an aromatic and/or heterocyclic ring, for example benzyl, naphthyl, anthracenyl, biphenyl and triphenyl radicals, or heterocycles, for instance pyridine, bipyridine, pyrrole, indole, furan, thiophene, purine, quinoline, phenanthrene, porphyrin, phthalocyanine and naphthalocyanine. 3,5,3',5'-Biphenyltetracarboxylic acid, acids derived from phthalocyanine and from naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid and 1,3,6,8-acridinetetracarboxylic acid are most particularly preferred, and even more particularly trimesic acid and 1,2,4,5-benzenetetracarboxylic acid.

Mention is also made of multifunctional compounds whose core is a heterocycle containing a point of symmetry, for instance 1,3,5-triazines, 1,4-diazines, melamine, compounds derived from 2,3,5,6-tetraethylpiperazine, 1,4-piperazines and tetrathiafulvalenes. Mention is made more particularly of 2,4,6-triaminocaproic acid 1,3,5-triazine (TACT).

Compound A is preferably chosen from polyamide-6.6, polyamide-6.12, polyamide-4.6, polyamide-6.10, polyamide-6.36, polyterephthalamide, and blends and copolymers based on these polyamides.

According to one preferred mode of the invention, compound A is a polyamide comprising at least 95 mol % of repeating units of PA-66. In particular, compound A can comprise repeating units of PA-6.

Compound B is preferably chosen from polyamide-6, polyamide-11, polyamide-12 and blends and copolymers based on these polyamides.

According to one preferred mode of the invention, compound B is a polyamide comprising at least 95 mol % of repeating units of PA-6. In particular, compound A may comprise repeating units of PA-66.

The compositions according to the invention are intended to be shaped by the usual techniques, for example by injection processes. They are suitable for manufacturing motor vehicle parts, for example bodywork parts, for manufacturing parts of sports and leisure articles, for example roller skates, and winter sports fastenings and shoes.

The compositions according to the invention have good thermomechanical properties. They in particular have a high deformation temperature under load. Without wishing to be bound to any theory, it is thought that this property is associated with the presence of the repeating units of type A.

This property, inter alia, can make the material suitable for withstanding processes for placing in paint by cataphoresis. The compositions are thus particularly suitable for preparing bodywork parts.

Other details or advantages of the invention will emerge more clearly in the light of the examples given below, solely as a guide.

Compounds Used:

Compound A1: a polyamide-66 with a relative viscosity (formic acid) of 50, sold by the company Rhodia Engineering Plastics Compound B1: a polyamide-6 with a relative viscosity (sulphuric acid) of 2.7, sold by the company Rhodia Engineering Plastics Compound C1: 2,2,6,6-tetra($\beta$-carboxyethyl)-cyclohexanone prepared according to the synthetic process described in the article "The Chemistry of Acrylonitrile II—Reactions with Ketones" JACS 64 2850 (1942) by Herman Alexander Buison and Thomas W. Riener.

Compound D: Wollastonite wicroll 10 PA.

Compound E: Isophthalic acid

Compound F: Aluminium stearate and carbon black

Assessments unnotched sample impact strength according to ISO standard 180/1A notched sample impact strength according to ISO 180/1U melt flow index MFI in g/10 minutes determined according to ISO standard 1133, under a 100 g load, at 275° C.

The surface aspect is observed on samples in the form of sheets of 15 cm by 10 cm, and 5 mm thick. Two criteria are assessed visually: the observation of fillers at the surface of the sheets, and the reflectivity.

EXAMPLES

The compositions are obtained by blending in a twin-screw extruder of Werner & Pfleiderer ZSK 40 type. he extrusion conditions are as follows:

Temperature: 270° C.

Rotational speed: 250 rpm

Output: 30 kg/hour

The compositions prepared are detailed in Table I. The proportions are given as weight percentages in the composition.

TABLE I

| Compound | Example 1 | Example 2 | Example 3 | Example 4 | Example 5 |
|---|---|---|---|---|---|
| Al | 37.7 | 57.7 | 58.7 | 38.7 | 37.7 |
| Bl | 20 | 0 | 0 | 20 | 20 |
| Cl | 1 | 1 | 0 | 0 | 0 |
| D | 40 | 40 | 40 | 40 | 40 |
| E | 0 | 0 | 0 | 0 | 1 |
| F | 1.3 | 1.3 | 1.3 | 1.3 | 1.3 |

The properties are mentioned in Table II.

TABLE II

| Property | Example 1 | Example 2 | Example 3 | Example 4 | Example 5 |
|---|---|---|---|---|---|
| Melt flow index (g/10 min) | 27 | 10 | 12 | 16 | 29 |
| Unnotched impact (kJ/m$^2$) | 65 | 50 | 66 | 68 | 55 |
| Notched impact (kJ/m$^2$) | 5.0 | 4.3 | 4.7 | 4.6 | 4.0 |
| Observation of fillers at the surface | NO | NO | YES | YES | NO |
| Reflectivity | YES | NO | NO | NO | YES |
| Equivalent molar concentration of reactive functions of compound C | 2.37 | 2.35 | 0 | 0 | 0 |

These examples show that compositions based on polyamide-66 modified by melt-introduction of a multifunctional compound have a melt flow index that is less than that of compositions based on polyamide-66, also comprising polyamide-6, and modified by melt-introduction of a multifunctional compound.

The compositions according to the invention furthermore have an improved surface aspect.

What is claimed is:

1. Modified polyamide comprising of being at least the following compounds which are melt-blended and melt-reacted together:

Compound A: a polyamide comprising repeating units of formula (I):

—[NH—R$_1$—NH—OC—R$_2$—CO]—    (I)

Compound B: a polyamide containing repeating units of formula (II):

—[NH—R$_3$—CO]—    (II)

Compound C: a multifunctional compound comprising at least three reactive functions selected from the group consisting of amines, carboxylic acids and derivatives thereof, the reactive functions being identical, the radicals R$_1$, R$_2$ and R$_3$ being hydrocarbon-based radicals optionally comprising hetero atoms.

2. Modified polyamide according to claim 1, whereinin the melt-blending and reaction are performed in an extrusion device.

3. Modified polyamide according to claim 1, wherein
the ratio between the mass of compound A and the total mass of the compounds A, B and C is between 1% and 98.5%
the ratio between the mass of compound B and the total mass of the compounds A, B and C is between 1% and 98.5%
the equivalent molar concentration of reactive functions of compound C in the polymer is greater than 1%.

4. Modified polyamide according to claim 3, wherein the ratio between the mass of compound A and the total mass of the compounds A, B and C is greater than 50%.

5. Modified polyamide according to claim 3, wherein the ratio between the mass of compound C and the total mass of the compounds A, B and C is between 1.5% and 10%.

6. Modified polyamide according to claim 1, wherein the multi-functional compound has an arborescent or dendritic structure.

7. Modified polyamide according to claim 1, wherein the multi-functional compound is represented by formula (III)

R4—[A-X—I—]$_m$    (III)

in which

A is a covalent bond or an aliphatic hydrocarbon-based radical possibly containing hetero atoms, and comprising from 1 to 20 carbon atoms;

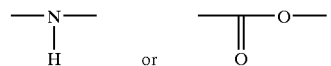

X is a radical

R$_4$ is a linear or cyclic, aromatic or aliphatic hydrocarbon-based radical containing at least two carbon atoms and possibly containing hetero atoms;

m is an integer between 3 and 8, limits included.

8. Modified polyamide according to claim 7, wherein the multifunctional compound is selected from the group consisting of 2,2,6,6-tetra (β-carboxyethyl)cyclohexanone, trimesic acid, 2,4,6-tri (aminocaproic acid)-1,3,5-triazine and 4-aminoethyl-1,8-octanediamine.

9. Modified polyamide according to claim 1, wherein compound A is selected from the group consisting of polyamide-66, and copolymers and blends thereof.

10. Modified polyamide according to claim 1, wherein compound B is selected from the group consisting of polyamide-6, and copolymers and blends thereof.

11. Composition comprising a matrix and at least one filler, wherein the matrix is a modified polyamide according to claim 1.

12. Composition according to claim 11, wherein the filler is selected from the group consisting of glass fibres, carbon fibres, kaolin, woflastonite and talc.

13. Composition according to claim 11, wherein the weight proportion of filler is between 25% and 80%.

14. Articles shaped from a composition according to claim 1.

15. Process for manufacturing a modified polyamide or a composition by extrusion, wherein the compounds introduced into the extrusion device comprise the following compounds:

Compound A: a polyamide comprising repeating units of formula (I):

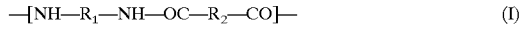
—[NH—R$_1$—NH—OC—R$_2$—CO]—    (I)

Compound B: a polyamide comprising repeating units of formula (II):

—[NH—R$_3$—CO]—    (II)

Compound C: a multifunctional compound comprising at least three reactive functions selected from the group comprising of amines, carboxylic acids and derivatives thereof, the reactive functions being identical, the radicals R$_1$, R$_2$ and R$_3$ being hydrocarbon-based radicals optionally comprising hetero atoms, optionally, a filler.

16. Process according to claim 15, wherein the extrusion temperature is greater than 250° C.

* * * * *